Figure 1:
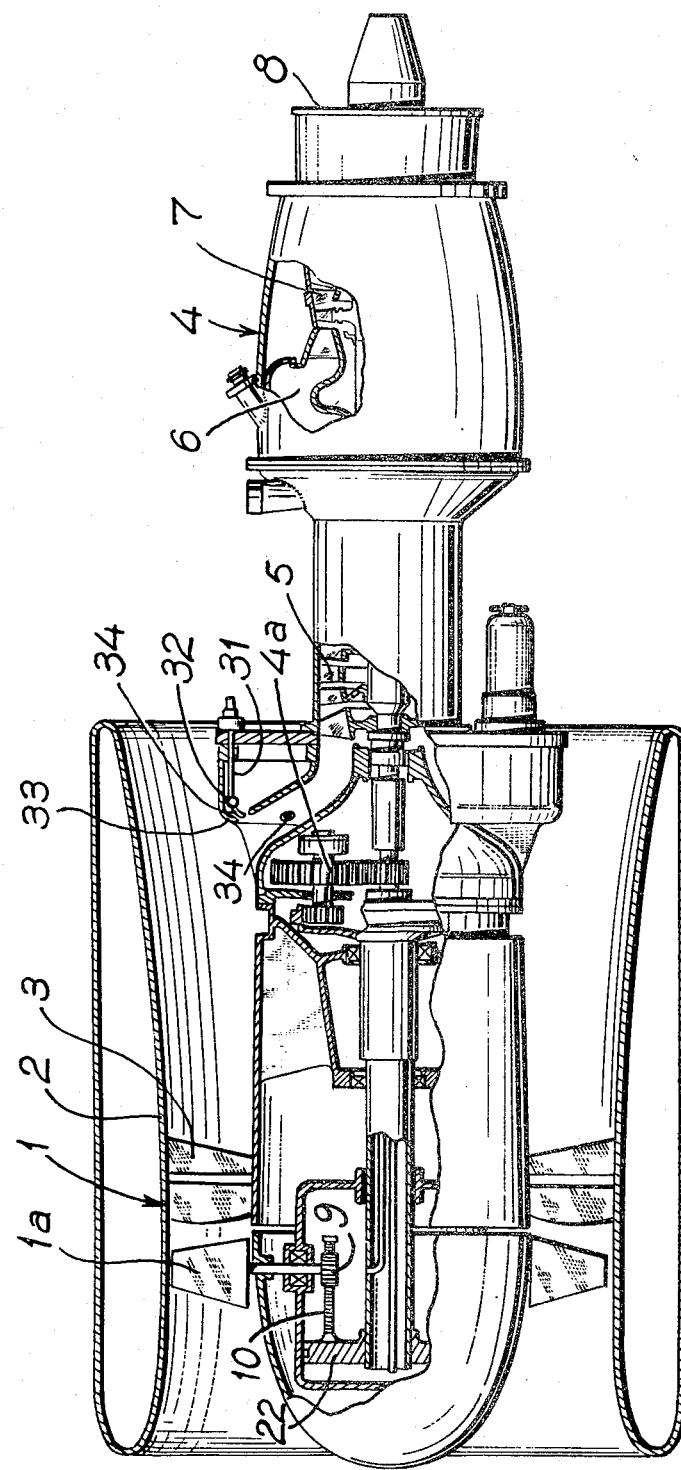

United States Patent [19]
Szydlowski

[11] 3,908,362
[45] Sept. 30, 1975

[54] BYPASS TURBOJET WITH VARIABLE PITCH LOW PRESSURE COMPRESSOR FOR THERMAL LOAD CONTROL

[76] Inventor: Joseph Szydlowski, Usine Turbomeca, Bordes (Basses-Pyrenees), France

[22] Filed: Apr. 27, 1971

[21] Appl. No.: 137,819

[30] Foreign Application Priority Data
June 29, 1970 France .............................. 70.23976

[52] U.S. Cl................. 60/226 R; 60/240; 60/39.27; 60/39.53; 60/39.67; 416/27
[51] Int. Cl.......... F02b 3/06; F02c 9/04; F02c 9/14
[58] Field of Search.... 60/39.23, 39.26, 233, 226 R, 60/262, 39.53, 240, 39.24, 39.25, 39.27, 39.29, 39.3; 416/28, 27, 29, 30

[56] References Cited
UNITED STATES PATENTS

| | | | |
|---|---|---|---|
| 2,686,631 | 8/1954 | Jordan .............................. | 60/39.53 |
| 3,097,700 | 7/1963 | Szydlowski.......................... | 416/28 |
| 3,100,964 | 8/1963 | Bevers et al. .................... | 60/39.3 X |
| 3,161,237 | 12/1964 | Szydlowski............................ | 416/1 |
| 3,476,486 | 11/1969 | Davies et al. ................ | 60/226 R X |

FOREIGN PATENTS OR APPLICATIONS

| | | | |
|---|---|---|---|
| 736,003 | 8/1955 | United Kingdom............... | 60/39.29 |
| 704,669 | 2/1954 | United Kingdom............... | 60/39.23 |
| 1,190,365 | 5/1970 | United Kingdom............... | 60/226 R |

Primary Examiner—Carlton R. Croyle
Assistant Examiner—Robert E. Garrett
Attorney, Agent, or Firm—Irving M. Weiner

[57] ABSTRACT

A bypass turbojet provided with tachometric fuel metering means for maintaining a constant engine rotation speed, characterized by the fact that a low-pressure compressor has variable-pitch blades for regulating the thrust delivered, variation of the pitch of said variable-pitch blades being controlled by a servo-mechanism associated to a thermal load limiter operating either as a temperature regulator ahead of the turbine subsequent to presetting of such temperature, or as a limiter in the event of manual control of the pitch of said blades.

3 Claims, 4 Drawing Figures

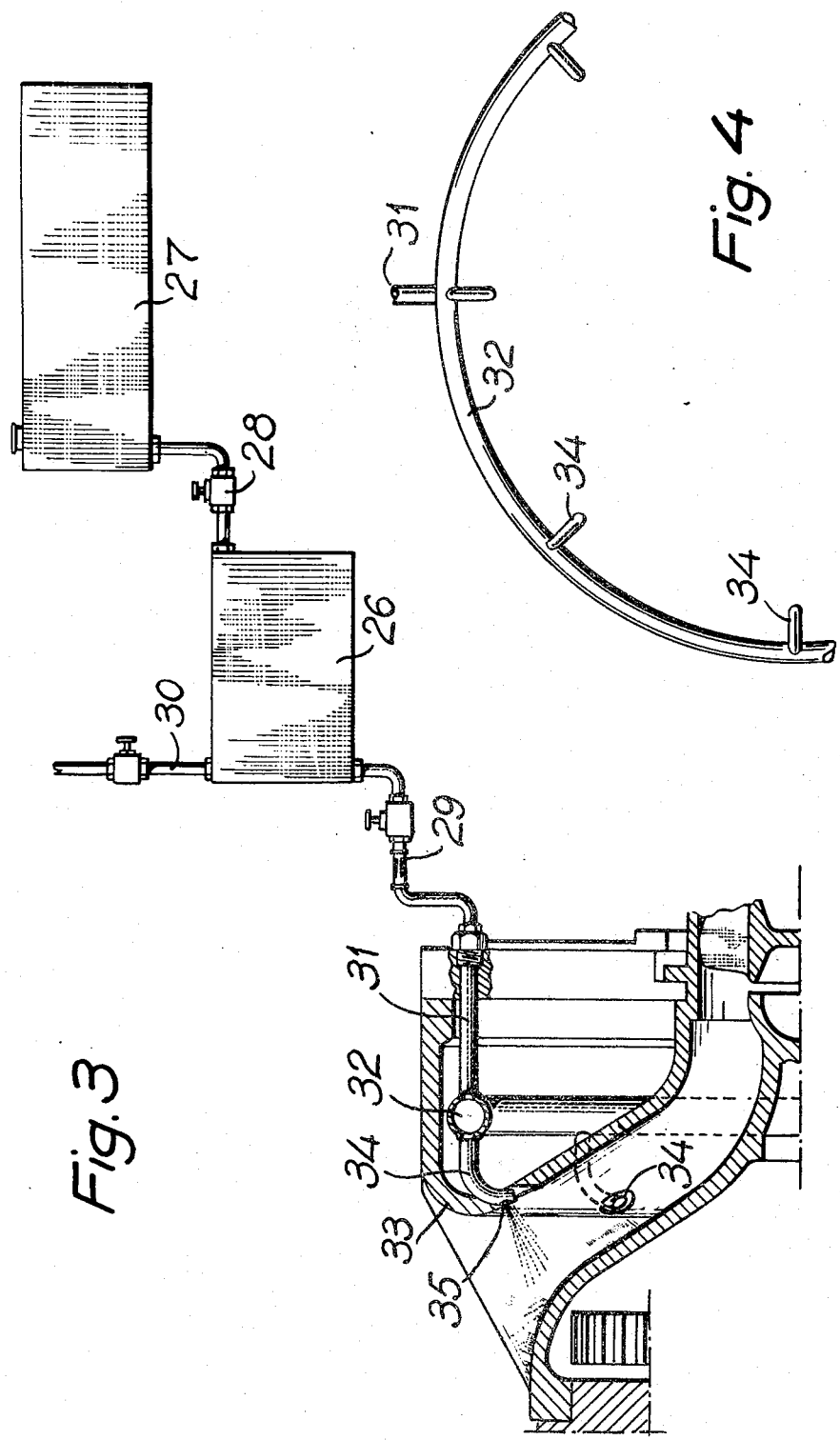

BYPASS TURBOJET WITH VARIABLE PITCH LOW PRESSURE COMPRESSOR FOR THERMAL LOAD CONTROL

The technical province of this invention is that of engines and more particularly gas turbine engines.

Bypass turbojets are engines in which a low-pressure axial compressor forming a blower (often and hereinafter referred to as a "fan") is combined with a turbojet. Part of the flow from the low-pressure compressor boosts the turbojet proper and the other part provides a cold jet that produces a thrust which is added to the thrust generated by the efflux of hog gas issuing from the turbojet.

Depending on the proportions of the two flows, such gas turbines are termed low-bypass-ratio or high-bypass-ratio engines. The recognized advantages of this type of propulsion unit are, firstly, greater thrust at low forward speeds, notably when aircraft powered by such engines are taking off, and, secondly, lower specific fuel consumption than single-flow turbojets.

Variations in the thrust of a bypass flow engine can be obtained by varying the engine rotation speed, but also by varying the incidence of the low-pressure compressor blades. With this latter method it is possible to maintain the engine rotation speed constant while retaining the possibility of varying the air mass flow from the low-pressure compressor, and hence the thrust developed. In U.S. Pat. Nos. 3,097,700 and 3,161,237 there are described improvements to gas turbines used to drive propellers or helicopter rotors.

One such improvement described consists in maintaining the rotation speed constant by means of a governor which operates on the quantity of fuel supplied to the engine, the propeller pitch being independently controlled in order not to exceed the maximum permissible thermal load on the engine.

A second improvement was that of simultaneously and continuously comparing the actual fuel flow with the theoretical maximum and minimum flows which could be supplied to the turbine, and accordingly controlling the variations in the propeller pitch.

In accordance with these improvements, it is possible to run the turbine throughout the operating range at constant rotation speed and with a substantially constant temperature ahead of the turbine.

The present invention relates to the application of such a regulating method to bypass turbojets.

It should be noted that if, instead of operating on the blade pitch of a propeller, one were to vary the setting of the low-pressure compressor blades, there is analogy but not identity, for in the case of a turboprop the supply of compressed air to the turbine is independent of the propeller pitch, whereas in the case of a bypass engine the conditions under which the low-pressure compressor operates directly affect the supply of air to the turbine's high-pressure compressor and hence affect the turbine itself, especially with regard to the air temperature, pressure and mass flow parameters.

This invention accordingly relates to a bypass and more particularly a high-bypass-ratio turbojet which is maintained at constant rotation speed by tachometric regulation of the quantity of fuel admitted and in which the variations in thrust are due to changes in the incidence of the blades of the low-pressure compressor associated to such turbojets, the tachometric regulation and the changes in blade incidence being so coordinated as to maintain the gas temperature ahead of the turbine substantially constant and equal to a set value.

In one embodiment of the invention the gas temperature ahead of the turbine is maintained constant by simultaneously and continuously comparing the actual fuel flow rate with the maximum theoretical rate which can be supplied to the turbine.

Further, it is well known that a rise in the temperature of the air supplied to the high-pressure compressor of the turbojet causes a substantial reduction in thrust and power even in the case of ordinary single-flow turbojets, and that the higher the bypass ratio in a bypass turbojet the more marked is this phenomenon, for in such cases the thrust produced by the hot flow is relatively small in relation to that supplied by the cold flow. Essentially, the turbine performs the function of a gas turbine engine producing the mechanical power needed to drive the low-pressure compressor; hence a rise in the temperature of the supply air results primarily in a loss of power that correspondingly reduces the output of which the low-pressure compressor is capable, and, consequently, the thrust generated by the cold flow, and the greater the relative magnitude of the cold flow the more substantial will be this reduction. As a rule, the loss of power due to this rise in temperature is a disadvantage only at take-off, for which configuration it is necessary to have the maximum possible thrust.

In order to reduce the detrimental effects of a transient temperature rise in the ambient air at the high-pressure compressor intake in the case of single-flow turbojets, recourse has been had to injecting a mixture of water and methanol into the intake flow. The water acts as a coolant and the methanol provides additional fuel for maintaining the gas temperature ahead of the turbine substantially constant.

The same method has been applied to bypass turbojets by injecting a similar mixture downstream of the low-pressure compressor or upstream of the high-pressure compressor.

While this method does in fact restore the power in part or even in full, it nevertheless has a number of disadvantages. In particular, while the injection of water and methanol takes place, the aircraft cabin cannot be pressurized because the air used for the purpose is charged with methanol vapour.

Since, in a bypass turbojet devised according to this invention as hereinbefore explained, the associated regulating system automatically corrects the fuel flow rate in such manner that the rotation speed and the temperature ahead of the turbine are maintained constant, this invention includes an injection system utilizing pure water instead of a water-methanol mixture, since an extra energy input through the methanol is unnecessary because the regulating system compensates for the effect of the water by correspondingly increasing the fuel flow rate.

The invention further includes an injection system of this kind in which total expulsion of the water is ensured by air scavenging after the water has been used up, thereby eliminating any risk of freezing or icing.

The description which follows with reference to the accompanying non-limitative exemplary drawings will give a clear understanding of how the invention can be carried into practice.

Figure 2:
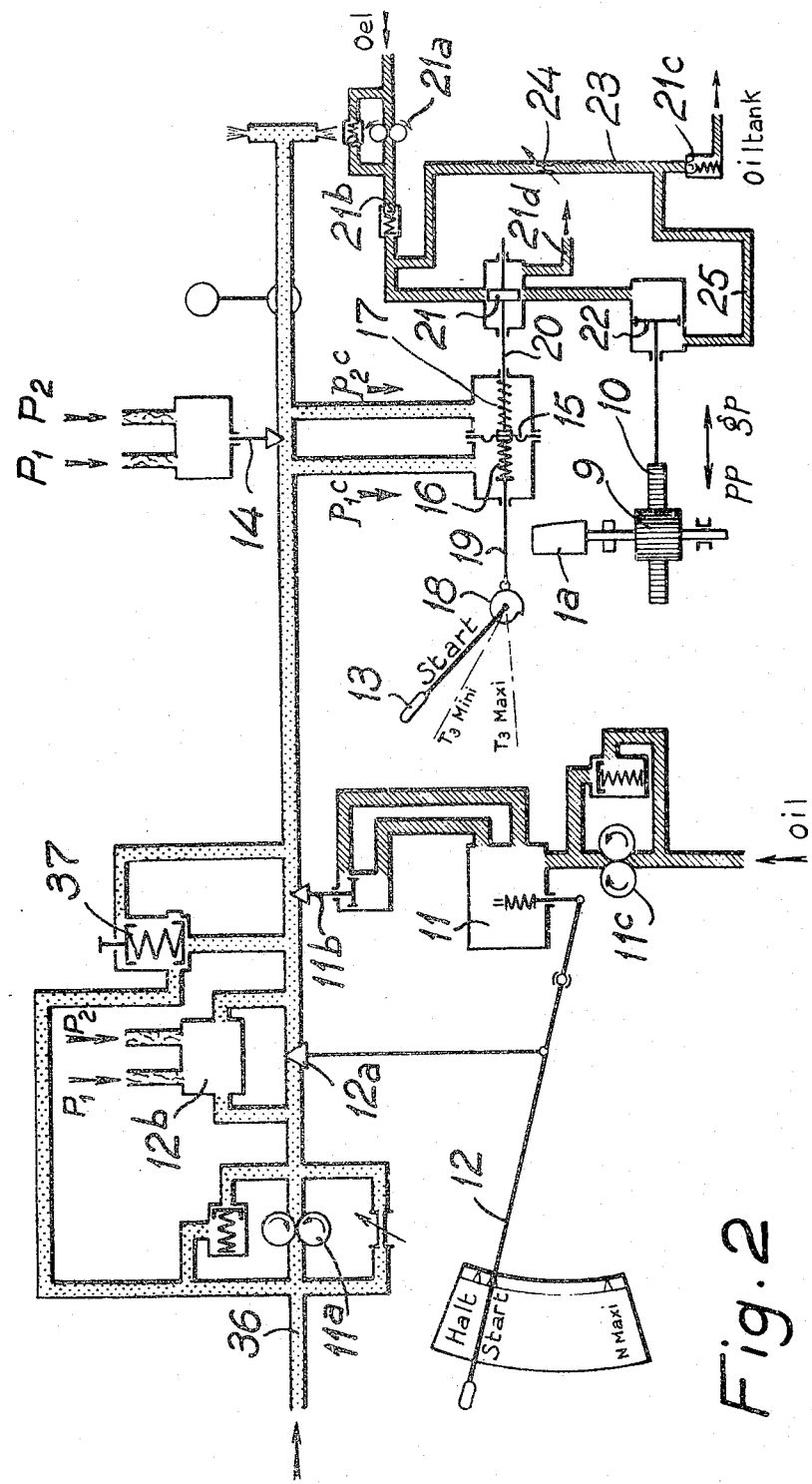

In the drawings:

FIG. 1 shows partly in section and with cutaway portions a diagrammatic side elevation view of a bypass turbojet devised according to this invention;

FIG. 2 schematically portrays a fuel flow regulating system associated to said turbojet;

FIG. 3 schematically illustrates the pure water supply system; and

FIG. 4 is a similar fragmental front view of a water distribution rail.

Reference is first had to FIG. 1 for a showing of a bypass turbojet essentially comprising a single-stage axial fan 1 and a gas turbine engine the turbine of which drives the fan through coaxial reduction gear.

The fan includes a bladed axial wheel 1a rotating within a shroud 2 and followed by stator blades 3. The blades of axial wheel 1a are provided with a mechanism for varying their incidence.

The air flow generated by fan 1 is discharged in part directly in the form of a jet, while the remainder flows through the compressor of the gas turbine. The gas turbine, which follows the fan and is designated by reference numeral 4, is connected to the fan through said coaxial reduction gear 4a and comprises a high-pressure compressor 5, a combustion chamber 6 and a turbine 7 with a hot-flow diffuser 8 at the exit end.

Each variable-incidence blade on the low-pressure compressor or fan 1 carries on its root a pinion 9 capable of cooperating with a rack 10 fast with the means for controlling variations in the pitch of said blades. As shown in FIG. 2, a regulating system associated to such a bypass turbojet essentially includes an isodromic speed governor of the kind described in U.S. Pat. No. 3,002,502 which maintains the turbine RPM constant by regulating the quantity of fuel admitted by means of a pump 11a and a metering device 11b actuated by the regulator 11 responsively to energy bled from a pump 11c for pressurizing the servocontrol fluid, which fluid may be the engine lubricant with advantage. A device 37 maintains a constant fuel pressure differential across the metering device 11b in order that the flow passing therethrough be proportional to the passageway cross-section determined by the position of said metering device.

Further, this fuel flow rate is compared by a thermal load limiter with the flow required to maintain the gas temperature ahead of turbine 7 at a constant value chosen according to the turbojet operating regime. This thermal load limiter includes a diaphragm 14 inserted into the fuel line, the section of which is adjusted according to the difference between the pressures $P_1$ and $P_2$ prevailing respectively at the inlet and exit ends of the high-pressure compressor, said diaphragm being associated to means hereinafter described for adjusting the incidence of the blades of low-pressure compressor 1a.

The engine is accordingly controlled by means of two levers, of which one, the lever 12, sets the regulator 11 after it has been moved from the "off" position to a "start" position and thereafter set once and for all on the reference regulating speed (lever 12 being coupled to a diaphragm 12a coordinated with a starting device 12b as a function of the difference between said air pressures $P_1$ and $P_2$), and the other, lever 13, is moved from a start position to one which is intermediate between two positions corresponding to the minimum and maximum gas temperatures ahead of the turbine, thereby to set the selected temperature which accordingly governs the blade pitch setting of low-pressure compressor 1 and hence the total thrust delivered by the engine, the above arrangements being possibly completed by manual control means of the blade pitch.

The thermal load limiter which actuates diaphragm 14 is of the type described in U.S. Pat. Ser. No. 3,161,237 hereinbefore mentioned. However, the regulator differs therefrom in some respects owing to the fact that variation of the pitch of blades 1a is controlled hydraulically, and not, as in the case of the aforementioned U.S. Pat. No. 3,161,237, by means of an electric motor. In addition to the aforesaid diaphragm 14 (the passageway section through which is adjusted by the difference in the pressures $P_1$ and $P_2$ upstream and downstream of high-pressure compressor 5 in such manner as to make it proportional to said difference) crossed by the fuel flow determined by metering device 11b of speed regulator 11, the load limiter further includes a chamber having a deformable membrane 15 on either side of which prevail the fuel pressures $P_{1c}$ upstream and $P_{2c}$ downstream of diaphragm 14, said membrane 15 being further subjected to the differential thrust exerted by two springs 16 and 17.

Through the agency of mechanical control means 19, a cam 18 actuated by lever 13 allows the compressive pressure of spring 16 to be modified. Further, membrane 15 is fast with an actuating rod 20 connected to slide-valve 21 communicating with an oil pressurizing circuit, which oil may be the lubricating oil. Via communications extending from the body of slide-valve 21, and depending on the way said membrane is moved responsively to changes in said pressures $P_{1c}$ and $P_{2c}$ and depending also on the position of lever 13, the slide-valve 21 allows of admitting a modulated oil pressure against the rear face of a piston 22 connected to the aforesaid rack 10, the front face of piston 22 being subjected at all time to a constant pressure below the maximum value of said modulated pressure.

When in response to the forces exerted against its two sides, membrane 15 is in a position of neutral equilibrium corresponding to that position of slide-valve 21 wherein the latter masks both an oil inlet passage and a passage for admitting oil against the rear face of piston 22, the blades 1a remain at a fixed pitch angle.

When responsively to motion of lever 13 or to a change in the difference between pressures $P_{1c}$ and $P_{2c}$, the membrane 15 is shifted and thrusts slide-valve 21 rightwardly of the figure, for example, the pressurized oil from a pumping unit 21a flowing through a check-valve 21b is admitted against the rear face of piston 22, causing the same to shift leftwardly and accordingly reduce the pitch angle of blades 1a (arrow pp) of low-pressure compressor 1. When this happens, the oil on the other side of piston 22 returns to the oil reservoir after flowing through a further calibrated valve 21c of rating below that of valve 21b.

Conversely, if for converse reasons the membrane 15 is caused to shift slide-valve 21 leftwardly, the oil on the righthand side of piston 22 returns directly to said reservoir via a discharge passage 21d in the slide-valve body, at the same time as a constant pressure tapped downstream of valve 21b from a conduit 23 and downstream of an adjustable throttling orifice 24 on conduit 23, but upstream of calibrated valve 21c, is admitted via a conduit 25 against the left face of piston 22. The latter accordingly shifts rightwardly (arrow gp) and the pitch of the low-pressure compressor blades 1a is coarsened.

The process of reducing or increasing the blade pitch continues responsively to the above-described control means until membrane 15 is restored into the steady state, which corresponds to a position of slide-valve 21 is registry with the outlet of a conduit located downstream of valve 21b and in registry with the outlet of a conduit having port in the cylinder through which piston 22 moves. In this way the actual rate at which fuel is injected into the combustion chamber is compared simultaneously and continuously with the theoretical rate at which fuel should be supplied for each chosen temperature ahead of turbine 7, and the changes in the pitch angle of the blades of low-pressure compressor 1 are controlled accordingly.

As shown in FIGS. 1, 3 and 4 in particular, an engine of this kind can be provided with a pure water injection system ahead of the high-pressure compressor.

Although the compression ratio produced by the low-pressure compressor is low and generally under 1.5, its effect is to cause a rise in the temperature of the air reaching the high-pressure compressor input, and this temperature rise can be several tens of degrees above the temperature of the ambient air. It is well known that turbojets are very sensitive to such temperature rises, which can cause a notable loss of thrust. In the case of a high-bypass-ratio turbojet, in which the thrust produced by the hot flow is relatively small compared to the thrust delivered by the cold flow, with the turbojet performing essentially the function of a gas turbine engine designed to furnish the mechanical power required to drive the low-pressure compressor, such a temperature rise nevertheless results in a loss of power which correspondingly reduces the output of the low-pressure compressor, and hence, ultimately, the thrust produced by the cold flow.

In order to overcome this drawback, a cooling of the air is effected by injecting pure water into the flow downstream of the low-pressure compressor.

A result of this is that at a constant rotation speed and a constant temperature of the gas issuing from the combustion chamber, water injection permits an increase in the quantity of fuel supplied to the combustion chamber, thereby increasing the power available on the compressor shaft and accordingly making it possible to increase the pitch angle of the blades of low-pressure stage 1 and hence the thrust produced by the cold flow. There is accordingly provided a water injection system comprising a reservoir 26 supplied by a possibly sheltered header 27, with an interposed shut-off valve 28. Reservoir 26 includes a water outlet 29 provided with a cock valve and an air supply conduit 30 likewise provided with a cock-valve. Conduit 30 communicates with an air bleed from high-pressure compressor 5.

Reservoir 26 further communicates via a pipe 31 with an annular injector rail 32 mounted in an air inlet lip 33 ahead of high-pressure compressor 5. Rail 32 is provided with a series of uniformly spaced injector tubes 34 within passages through the wall of said air inlet. The end of each tube 34 is provided with a calibrated orifice 35 which is so directed that the water is discharged perpendicularly to the air flow at the high-pressure compressor inlet. Thus, notwithstanding a low injection pressure, a high degree of atomization is ensured.

Water injection is activated by the valve on conduit 29 when the air valve on conduit 30 is open and the valve on conduit 28 closed. Between reservoir 26 and rail 32 is provided an orifice with a calibrated section for determining the overall water injection rate.

When all the water contained in reservoir 26 has been used, the air valve on conduit 30 and the water valve on conduit 29 can be kept open for a time in order to permit full scavenging and drying out of injection system, thereby eliminating any risk of icing. The header tank 27 can be used to fill the reservoir 26 in readiness for the anticipated engine operating conditions, in good time before the injection system is activated, or else in order to repeat such injection if need be.

What I claim is:

1. In a bypass turbojet having a main duct, a bypass duct, a low pressure compressor and a high pressure compressor in series flow with the low pressure compressor and disposed in the main duct, the low pressure compressor additionally feeding the bypass duct and turbine means for actuating the compressors, the improvements which comprise:
   a. the low pressure compressor having variable pitch blading disposed in both the bypass duct and the main duct;
   b. tachometric fuel metering means for maintaining a constant rotational speed of the turbine means;
   c. a servomechanism operatively connected to the variable pitch blading of the low pressure compressor; and
   d. a thermal load limiter for regulating the temperature ahead of the turbine means and operatively connected to the servomechanism including means responsive to the instantaneous actual fuel flow to the turbine means as compared to the theoretical maximum flow rate which can be admitted to the turbine means and generating a signal proportional thereto,
   e. means responsive to the signal for automatically reducing the blade pitch as soon and as long as either the actual turbine means temperature or the actual rate of fuel flow tends to exceed its upper limit,
   f. the means responsive to the signal automatically increasing the blade pitch as soon as either the difference between the actual rate of fuel flow and its lower limit or the fuel feeding in flight for the turbine means tends to a zero valve.

2. A by-pass turbojet according to claim 1, wherein pure water injecting means are disposed downstream of said low pressure compressor in the air stream at the inlet of said high pressure compressor.

3. A by-pass turbojet according to claim 2, in which said pure water injecting means comprises, in combination:
   a pure water tank;
   a reservoir;
   duct means connected between said pure water tank and said reservoir;
   a source of compressed air;
   communication means interconnected between said pure water tank, said reservoir, and said source of compressed air;
   a lipped member situated upstream of said high pressure compressor and in an inlet of said high pressure compressor;

a plurality of nozzles situated in the vicinity of said lipped member;

distributing means communicating with said reservoir and said nozzles;

and said nozzles being positioned and oriented so that pure water is discharged from said nozzles substantially perpendicular to the direction of the air flowing into said high pressure compressor, and whereby said reservoir is emptied and scavanged, and spray is discharged through said nozzles regularly into the air flowing into said high pressure compressor.

* * * * *